(12) United States Patent
Hou et al.

(10) Patent No.: US 10,067,038 B2
(45) Date of Patent: Sep. 4, 2018

(54) ANALYZING EQUIPMENT DEGRADATION FOR MAINTAINING EQUIPMENT

(71) Applicant: Accenture Global Services Limited, Dublin (IE)

(72) Inventors: Fang Hou, Beijing (CN); Yan Gao, Beijing (CN); Xiaopei Cheng, Beijing (CN)

(73) Assignee: Accenture Global Services Limited, Dublin (IE)

( * ) Notice: Subject to any disclaimer, the term of this patent is extended or adjusted under 35 U.S.C. 154(b) by 239 days.

(21) Appl. No.: 14/913,222

(22) PCT Filed: Mar. 24, 2015

(86) PCT No.: PCT/CN2015/074946
§ 371 (c)(1),
(2) Date: Feb. 19, 2016

(87) PCT Pub. No.: WO2016/149906
PCT Pub. Date: Sep. 29, 2016

(65) Prior Publication Data
US 2017/0038280 A1    Feb. 9, 2017

(51) Int. Cl.
*F04B 51/00* (2006.01)
*G01M 99/00* (2011.01)
(Continued)

(52) U.S. Cl.
CPC ........... *G01M 99/008* (2013.01); *F04B 51/00* (2013.01); *G06Q 10/063* (2013.01); *G06Q 10/20* (2013.01); *G06T 11/206* (2013.01)

(58) Field of Classification Search
CPC .... G01M 99/008; F04B 51/00; G06T 11/206; G06Q 10/063; G06Q 10/20; G01R 31/343; G08B 31/00; G05B 23/0254; G05B 9/02
(Continued)

(56) References Cited

U.S. PATENT DOCUMENTS

2002/0143421 A1    10/2002    Wetzer
2013/0024179 A1*   1/2013    Mazzaro ............... G06Q 10/04
                                                                   703/18
2015/0073751 A1    3/2015    Liao et al.

FOREIGN PATENT DOCUMENTS

WO    WO 03/023664 A1    3/2003
WO    WO 2008/151240 A1    12/2008
(Continued)

OTHER PUBLICATIONS

Patent Examination Report No. 1 dated May 3, 2016 for Australian Patent Application No. 2016201794 (4 pp.).
(Continued)

*Primary Examiner* — Mouloucoulaye Inoussa
(74) *Attorney, Agent, or Firm* — Brinks Gilson & Lione

(57) ABSTRACT

A method and system for analyzing equipment degradation for maintaining the equipment are provided. The method and system receive and store equipment and sensor data associated with operational equipment, generate a display signal to display a relationship analysis window, a residual error window, a performance condition window, and a maintenance trigger window, and evaluate a coordinated relationship between the equipment sensor data and the environmental data, determine residual errors and determine a Historical Health Condition Index (HHCI) for the operational equipment and generate a Future Health Condition Index (FHCI) from the HHCI, and generate an equipment
(Continued)

maintenance trigger for the operational equipment by establishing a trigger threshold for maintenance.

17 Claims, 20 Drawing Sheets

(51) Int. Cl.
  *G06Q 10/06* (2012.01)
  *G06Q 10/00* (2012.01)
  *G06T 11/20* (2006.01)

(58) Field of Classification Search
  USPC ........ 702/58, 183, 185; 324/765.01; 700/31, 700/28, 30, 44
  See application file for complete search history.

(56) References Cited

FOREIGN PATENT DOCUMENTS

| | | |
|---|---|---|
| WO | WO 2012/001653 A2 | 1/2012 |
| WO | WO 2014/044906 A1 | 3/2014 |

OTHER PUBLICATIONS

International Search Report and Written Opinion dated Dec. 25, 2015 for PCT Application No. PCT/CN2015/074946 (8 pp.).

* cited by examiner

ANALYZING EQUIPMENT DEGRADATION FOR MAINTAINING EQUIPMENT

CROSS-REFERENCE TO RELATED APPLICATIONS

This application claims the priority of International Application No. PCT/CN2015/074946, filed on Mar. 24, 2015, which is hereby incorporated herein by reference in its entireties.

TECHNICAL FIELD

This disclosure is in the area of equipment maintenance. Particularly, this disclosure relates to equipment degradation forecast and equipment operation health condition analysis by using a model-based approach

BACKGROUND

In many instances, equipment (e.g., rotor equipment such as turbines) operates continually in oil refinery plants, water plants, and other settings. Regardless of whether the equipment operates on a continuous basis, keeping equipment under healthy operating conditions is quite important for meeting output and production goals, among other reasons. Improvements in equipment maintenance will facilitate the efficient operation of machinery.

DETAILED DESCRIPTION

The present disclosure concerns an equipment degradation analysis system that can effectively evaluate the health condition of equipment for predictive maintenance. In one implementation, the system evaluates health condition using a health condition index (HCI). The may analyze multiple equipment types, including those equipment types for which there are no available data samples, e.g., equipment degradation samples.

Figure 1:
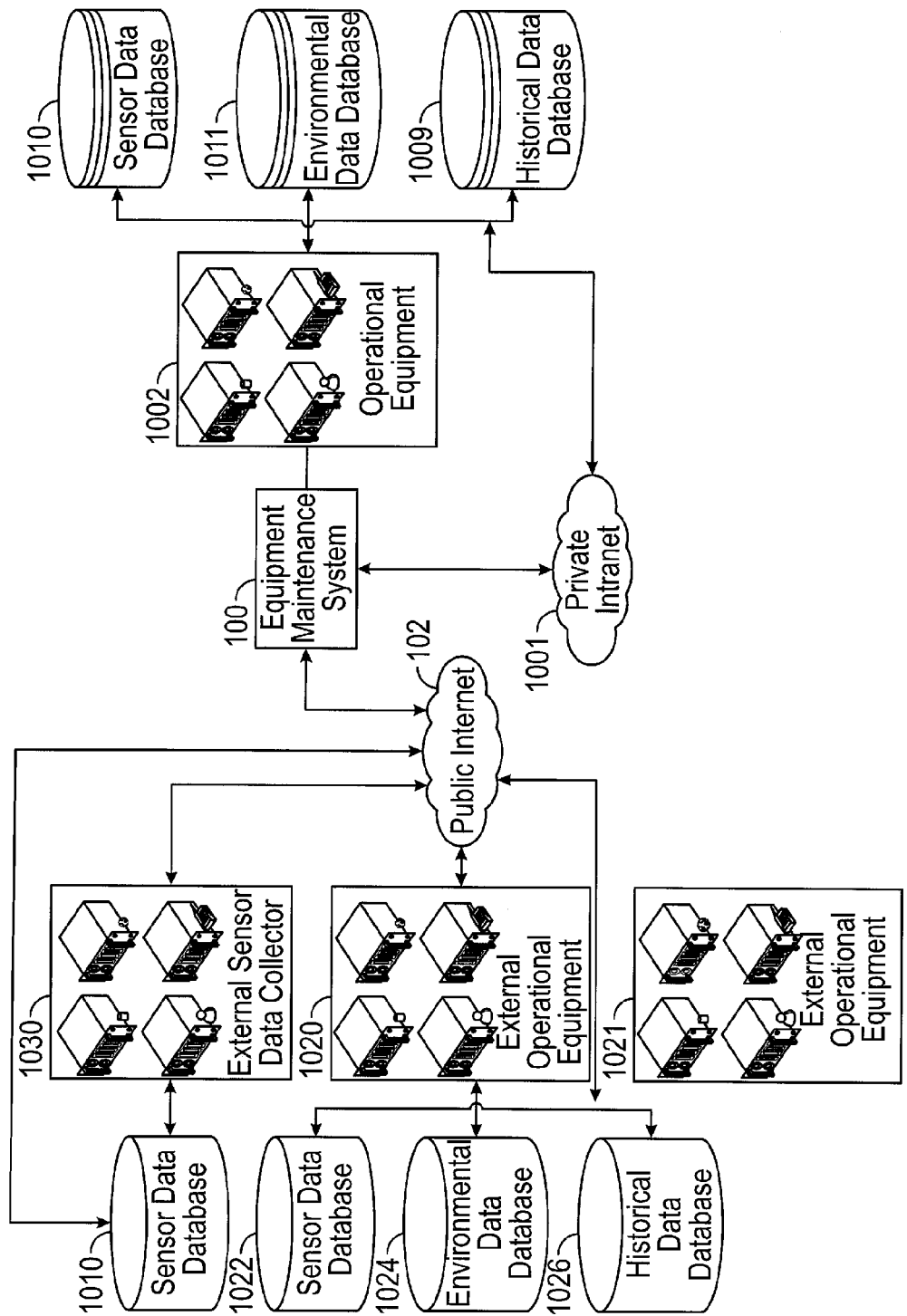
FIG. 1 shows an example system diagram that depicts the data flow for the equipment maintenance system.

FIG. 1 shows an example system diagram that depicts the data flow for the equipment maintenance system 100. As shown in FIG. 1, the equipment maintenance system 100 may connect to operational equipment 1002 via the network 1001, e.g., a private or public Intranet, and may send requests and receive data from the operational equipment 1002. The operational equipment 1002 and the system 100 may connect with the sensor data database 1010, the environmental data database 1011, and the historical data database 1009. The operational equipment 1002 may provide sensor data, environmental data and historical data that may be stored in the sensor data database 1010, the environmental data database 1000 and the historical data database 1009.

The operational equipment 1002 may also send sensor data, environmental data and historical data to the equipment maintenance system 100 directly. As illustrated in FIG. 1, the equipment maintenance system 100 may directly access sensor data database 1010, environmental data database 1011 and historical data database 1009 via the private Intranet 1001. Also, not all of the environmental data, historical data sensor data and sensor data need to be directly from operational equipment 1002. The sensor data database 1010, environmental data database 1011, and historical data database 1009 may store data that may be received from other sources.

FIG. 1 also shows that the equipment maintenance system 100 may connect to the external sensor data collector 1030, and any external equipment, e.g., the first external operational equipment 1020 and the second external operational equipment 1021 via the network 102, e.g., the public Internet. The equipment maintenance system 100 may request and receive data from the external sensor data collector 1030, the external operational equipment 1020 and the external operational equipment 1021.

The external sensor data collector 1030 may collect sensor data and store the sensor data to the sensor data database 1010. The first external operational equipment 1020 may also collect sensor data, environmental data and historical data and store them in the first sensor data database 1022, the environmental data database 1024 and historical data database 1026.

As shown in FIG. 1, the equipment maintenance system 100 may directly access sensor data database 1010, the first sensor data database 1022, the environmental data database 1011 and the historical data database 1009 via the public Internet 102. The equipment maintenance system 100 may also obtain data directly from the second external operational equipment 1021 even though the second external operational equipment 1021 may not store data to the database. The data flow shown in FIG. 1 is just for illustration purpose, many other data flow implementations for the equipment maintenance system are also possible and within the scope of the present disclosure.

Figure 2:
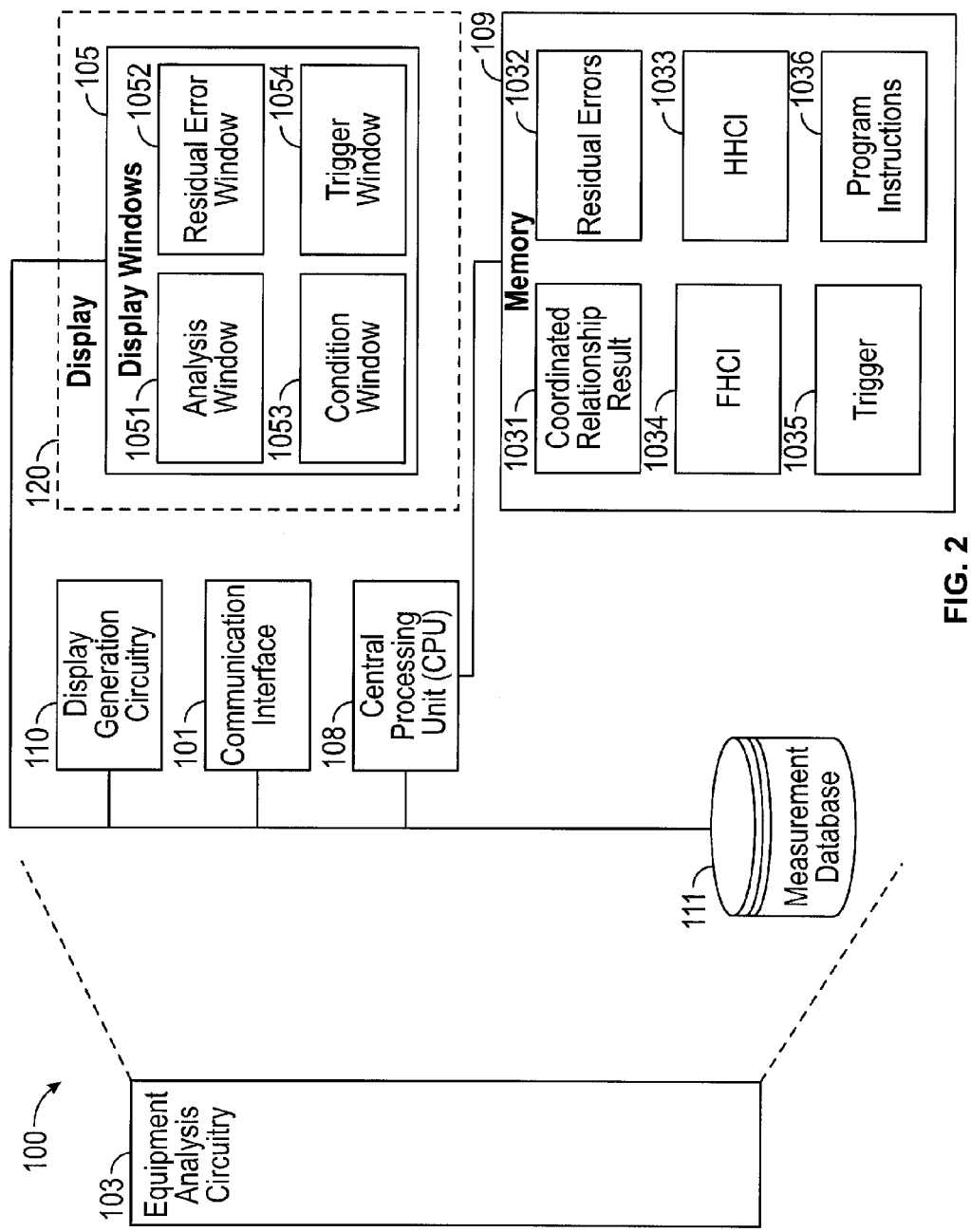
FIG. 2 shows an example system diagram that depicts the equipment maintenance system.

FIG. 2 shows an example system diagram that depicts the equipment maintenance system 100 implemented with equipment analysis circuitry 103. As illustrated in FIG. 2, the system 100 may include the communication interface 101, the measurement database 111, the display generation circuitry 110 and the equipment analysis circuitry 103. The system 100 may be in local or remote communication with a display 120, e.g., a local monitor, an application interface on a smart phone, or another display.

The communication interface 101 may be configured to receive, from the measurement database 111, equipment sensor data representing an equipment performance parameter from among multiple different performance parameters associated with the operational equipment. The environmental data represents, for example, an environmental characteristic of a location where the operational equipment is located. The measurement database 111 may be configured to store the sensor data and the environmental data that may be received from the communication interface.

The display generation circuitry 110 may be configured to generate a display signal that may be displayed in one of a relationship analysis window 1051, a residual error window 1052, a performance condition window 1053, and a maintenance trigger window 1054. The display generation circuitry 110 may be configured to generate the display signal that may be displayed in other windows.

The equipment analysis circuitry 103 may be in communication with the measurement database 111 and the display generation circuitry 110. The equipment analysis circuitry 103 may contain memory 104. The memory 104 may store program instructions 1036 executed by the processor 108 that are configured to, as examples:

Evaluate a coordinated relationship 1031 between the equipment sensor data and the environmental data to obtain a relationship output, and provide the relationship output for display in the relationship analysis window 1051;

Determine residual errors 1032 showing differences between the relationship output and the equipment sensor data stored in the measurement database 111, and provide the residual errors for display in the residual error window 1052;

Determine a Historical Health Condition Index (HHCI) 1033 for the operational equipment from the residual errors and generate a Future Health Condition Index (FHCI) 1034 from the HHCI 1033, and provide the HHCI 1033 and the FHCI 1034 for display in the performance condition window 1053; and generate an equipment maintenance trigger 1035 for the operational equipment by establishing a trigger threshold for maintenance, and provide the equipment maintenance trigger for display in the maintenance trigger window 1054.

The equipment analysis circuitry 103 that evaluates a coordinated relationship 1031 may be configured to evaluate the coordinated relationship between the equipment sensor data and the equipment sensor data or between the equipment sensor data and the environmental data or between the equipment sensor data and the equipment sensor data as well as the environmental data. The equipment analysis circuitry 103 may first determine a subset of operational parameters from the equipment sensor data and the environmental data, and evaluate the coordinate relationship 1031 between any of two or more parameters within the subset of the operational parameters.

The equipment analysis circuitry 103 that generates FHCI 1034 may be configured to predict mean series and Standard Deviation (SD) of the FHCI and generate the FHCI based on the predicted mean series and SD of FHCI.

Figure 3:
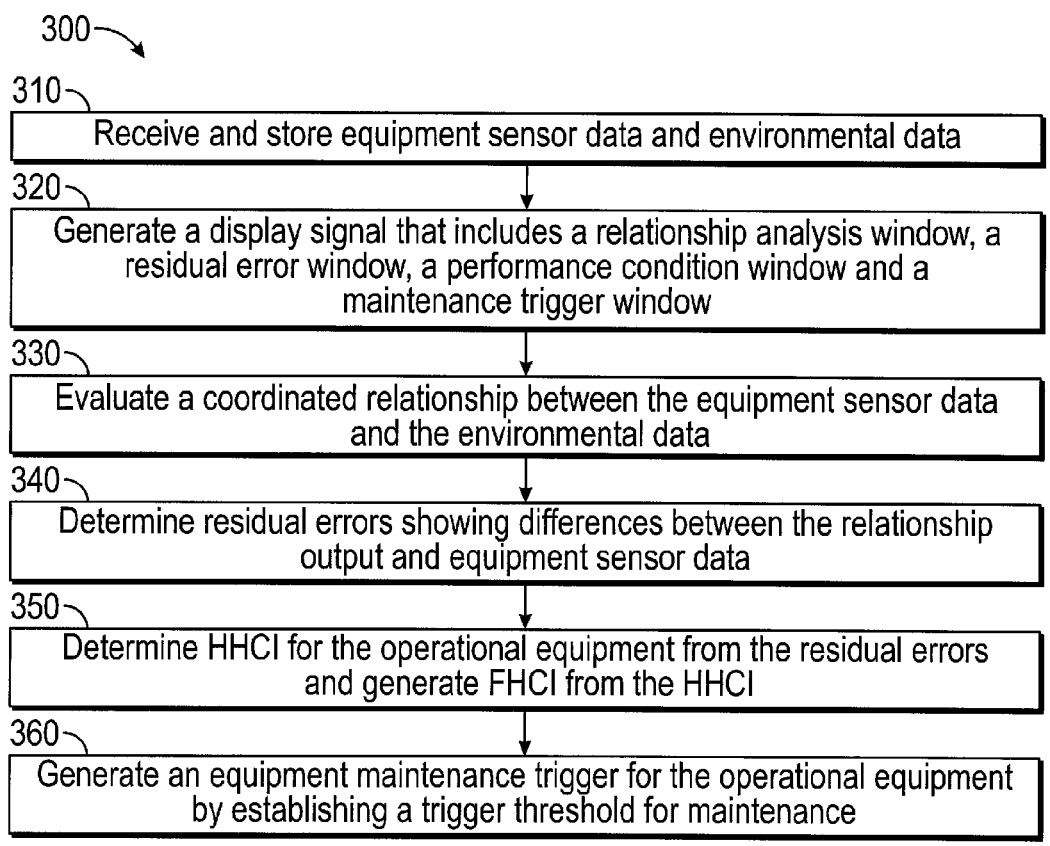
FIG. 3 illustrates an example of logic for analyzing equipment degradation for maintaining the equipment.

FIG. 3 illustrates an example of logic 300 for analyzing equipment performance and maintaining the equipment. The logic may be implemented in the system 100 shown in FIG. 2, for instance, as the program instructions in the memory 109. The logic 300 includes receiving and storing equipment sensor data and environmental data (310), e.g., by receiving, from a communication interface, equipment sensor data representing an equipment performance parameter from among multiple different performance parameters associated with operational equipment; receiving, from the communication interface, environmental data representing an environmental characteristic of a location where the operational equipment is located; and storing the sensor data and the environmental data received from the communication interface into a measurement database.

Equipment sensor data may be captured and stored in the database 111. The equipment sensor data may be captured through sensors on or in proximity to the operational equipment, and may be transferred via the communication interface 101 from the equipment sensors to one or more processors 108 and then may be stored in the memory 109. Different sensor data may be captured and stored. For example, the axle temperature of an oil pump for a period of time (for the past three months, for example) may be captured by a sensor of the oil pump and stored in the memory 109.

Environmental data may also be obtained and stored in the memory 109. For example, the environmental temperature may be obtained as one type of the environmental data. The environmental temperature for a period of time (for the past three months for example) may be collected from a third party and received via the communication interface 101. The environmental data may also be stored in the memory 109. The environmental data may also be stored in any other data repositories.

Sensor data and environmental data may become historical data after they are obtained and stored in the memory 109. After the sensor data are captured, the sensor data may be considered historical data after they are stored in the memory 109. For example, the axle temperature for an oil pump for the past three months become historical data after three months of axle temperatures are captured and stored in the memory 109.

In general, the long term trend of one or more operational parameters (OPs) of the equipment may help illustrate the degradation progress of the equipment physical health condition. An OP may be used for monitoring. When the OP runs out of limit, it may result in the equipment fault. For example, when the axle temperature is higher than the pre-determined limit, the equipment may not function properly. Therefore, the axle temperature may be an OP. The axle vibration of the pumps may be another example of the OP for the equipment.

A subset of sensor data may be selected from the memory 109 to develop the OP for analyzing the degradation of the equipment. The memory 109 may store the long term historical records. The method disclosed in the present disclosure may be to leverage historical monitoring data, for example selecting a subset of sensor data stored in the memory 109, to develop a number of predetermined and preselected OPs of the equipment to analyze and predict its degradation. The example equipment to be analyzed may include the rotor equipment such turbines, pumps, or any other equipment.

The environmental data stored in the memory 109 or received from other sources may also be used for OP analysis. OP value may be affected not only by the equipment physical condition but also by the production/operation condition and environmental condition. The related environmental data may also be used and preprocessed for OP analysis. For example, if the axle temperature is determined as the OP and the operational limit of the sample pump's axle temperature may be 70 degrees Celsius. In order to analyze when the pump's temperature may exceed the limit of 70 degrees, the environmental temperature may be used because the axle temperature may also be affected by the environmental temperature. Some coordinated relationship may exist between the two temperatures.

The logic 300 may further determine a subset of operational parameters from either the equipment sensor data or the environmental data for conducting further relationship analysis.

The data validation and data cleaning may also be performed for both the sensor data and environmental data stored in the memory 109 or received from other sources. For example, both axle temperature and environmental temperature may be checked validity when they are read out from the memory 109. If the temperature is too high, e.g., 500 degrees, or too low, e.g., −200 degrees, or simply missing, the temperature associated data may be determined invalid and may be skipped or deleted from the OP analysis.

The logic 300 may generate a display signal that includes a relationship analysis window, a residual error window, a performance condition window and a maintenance trigger window (320). The generation of the display signal may include: generating, by display generation circuitry, a display signal to display in at least one of: a relationship analysis window, a residual error window, a performance condition window, and a maintenance trigger window. The display windows may be more than those two types. Additional windows may be developed.

The logic 300 may also evaluate a coordinated relationship between the equipment sensor data and the environmental data (330). The evaluation may include evaluating, by equipment analysis circuitry that is in communication with the measurement database and the display generation circuitry, a coordinated relationship between the equipment sensor data and the environmental data to obtain a relationship output, and providing the relationship output for display in the relationship analysis window.

The coordinated relationship may be a demonstration between the OP and the equipment sensor data as well as the environmental data. As discussed above, the OP value may be affected by the production/operation condition and environmental condition. Therefore, certain coordinated relationship may exist between certain sensor data such as axle temperature and certain environmental data such as environmental temperature. A display window may be developed to show the coordinated relationship.

As discussed above, the subset of OPs may be either equipment sensor data or environmental data. The coordinated relationship may be shown for any two or more of OPs from the subset.

A regression may be performed to show the coordinated relationship. For example, a regression for the axle temperature and the environmental temperature may be run and the result may be displayed in the relationship analysis window. The example of the regression analysis and display is provided in FIG. 8.

The regression analysis may be performed by using data when the equipment is under healthy condition and between OP and other correlated parameters. The regression analysis may start with selecting reasonable sample data set from when the equipment is in relatively good health condition and then use the selected data set to perform the regression analysis between OP and other correlated parameters. The reason for selecting sample from healthy period of the equipment is to attempt to represent the performance of healthy equipment with the regression formula and avoid the disturbance from the aging of the equipment. Therefore, the long term trend of the error between the actual OP value and calculated OP value using the regression formula may be able to help illustrate the performance degradation of that equipment. The regression formula developed from the regression analysis may be represented as:

$$OP = f(x), x = (x_1, \ldots, x_n) \quad (1)$$

As shown in Formula 1, the parameters x may include the equipment sensor data and environmental data that may be correlated with OP.

The logic 300 may also determine residual errors showing differences between the relationship output and the actual OP value (340). The actual OP value may be the equipment sensor data or environmental data. The determination may include: determining, by the equipment analysis circuitry, residual errors showing differences between the relationship output and the equipment OP stored in the measurement memory 109, and providing the residual errors for display in the residual error window.

The residual errors may be calculated by using the regression formula and the historical data stored in the memory 109 for the correlated parameters. As an illustration, the residual error may be the difference between the calculated and actual value of OP. The calculation of the residual error may be represented as:

$$Res = OP_{act.} - OP_{calc.} \quad (2)$$

As shown in Formula 2, the $OP_{act}$ is the actual monitored OP value, and the $OP_{calc.}$ is the calculated OP using the formula OP=f(x) in Formula 1.

The logic 300 may determine HHCI for the operational equipment from the residual errors, generate the mean series and SD series of HHCI and generate the predicted mean and standard deviation of FHCI from the mean series and SD series of HHCI (350). The logic 300 may also generate FHCI by using HHCI directly. The determination may include: determining, by the equipment analysis circuitry, a HHCI for the operational equipment from the residual errors and generating a FHCI from the HHCI, and providing the HHCI and the FHCI for display in the performance condition window.

The HHCI may be determined when the residual errors follow a normal distribution. Because the equipment degradation may be a slow gradual process, the historical HCI to be determined may be relatively stable and may follow the normal distribution for each reasonable historical time window. The HHCI may be within a reasonable time window (e.g. a day or a week or month, etc.) with gradually changing mean and standard deviation (SD) through different time window. If the residual error follows the normal distribution, the residual error may be selected as the HCI or HHCI. However, the process may repeat to select the parameter and conduct the regression analysis to find suitable parameters in order to get the good regression formula for developing HHCI.

When the residual error follows the normal distribution and is selected as HCI, the HHCI may be represented as:

$$HCI = Res \quad (3)$$

After the HHCI is determined, the future mean series and SD series of FHCI may be predicted by using the HHCI.

When the HHCI is calculated periodically, the mean and SD may also be calculated for the HHCI. Because the degradation analysis may mainly care about the long term or mid-term trend of HCI, the filtering/smoothing methods like moving average could be used for filtering out the noise or local fluctuation of the mean and SD of HHCI to get the overall trend. Thus, based on the smoothed periodic mean series of the HHCI, the approximate fitting & prediction model may be obtained and trained. As such, the fitting model may be used to predict the periodic mean value for the periods in the following year or half year. The same procedure may also be conducted for the SD series of HCI. As such, the long term trend of the mean series and the SD series of HCI could be fitted and predicted and the mean series as well as the SD series of FHCI may be generated. HHCI may also be used to generate FHCI without predicting the future means series and SD series.

The logic 300 may generate an equipment maintenance trigger for the operational equipment by establishing a trigger threshold for maintenance (360). The generation may include: generating, by the equipment analysis circuitry, an equipment maintenance trigger for the operational equipment by establishing a trigger threshold for maintenance, and providing the equipment maintenance trigger for display in the maintenance trigger window.

The equipment maintenance trigger may be generated by setting an alert level for a particular predicted degradation probability. Based on the predicted periodic mean trend value and standard deviation (SD) trend value of HCI, the probability formula of normal distribution may be used to calculate the limit violation probability of HCI in the future and get the degradation probability prediction curve.

In order to determine the limit violation probability of HCI, the limit of HCI may first be calculated. Because HCI is a designed index and is not necessarily given a limit, the calculation of NCI's limit for equipment degradation analysis may be needed. By design, HCI may be the difference between $OP_{act}$ and $OP_{calc.}$. The $OP_{act}$ may be the parameter and may be normally given a certain limit by the manufacturer or industry standard. Then the limit of HCI may be calculated as the difference between the OP limit and the $OP_{calc.}$ by using the following formula:

$$Lim_{HCI} = Lim_{KSP} - OP_{calc.} \quad (4)$$

The probability of limit violation may then be calculated. Based on the calculated HCI limit and the predicted daily HCI Mean and SD, the limit violation probability of HCI may be calculated using the following normal distribution probability formula:

$$P(x > \text{Lim}) = \int_{Lim}^{+\infty} \frac{1}{\sigma\sqrt{2\pi}} e^{-\frac{1}{2}\left(\frac{x-\mu}{\sigma}\right)^2} dx \quad (5)$$

$x = HCI, \sigma = HCI\ SD, \mu = HCI\ \text{Mean}$

Thus, the equipment maintenance trigger may be set for the operational equipment by establishing an alert level as a trigger threshold for maintenance. According to a calculation of the probability of limit violation, if the predicted probability keeps increasing and when it reaches an alert level (e.g. >10%), then the system 100 may indicate that the equipment needs maintenance. The maintenance time may be set to a particular day, for instance, or it may be recommended as a day before the predicted alert date. For example, if the probability goes above 10% on the $109^{th}$ day in the future, the maintenance date may be selected as the $108^{th}$ day in the future, or any other time before the 109th day. Thus, when the alert level or the trigger threshold is exceeded (10%), the future maintenance date may be determined. And then, a maintenance notification may be generated and send to a recipient by using the communication interface.

Figure 4:
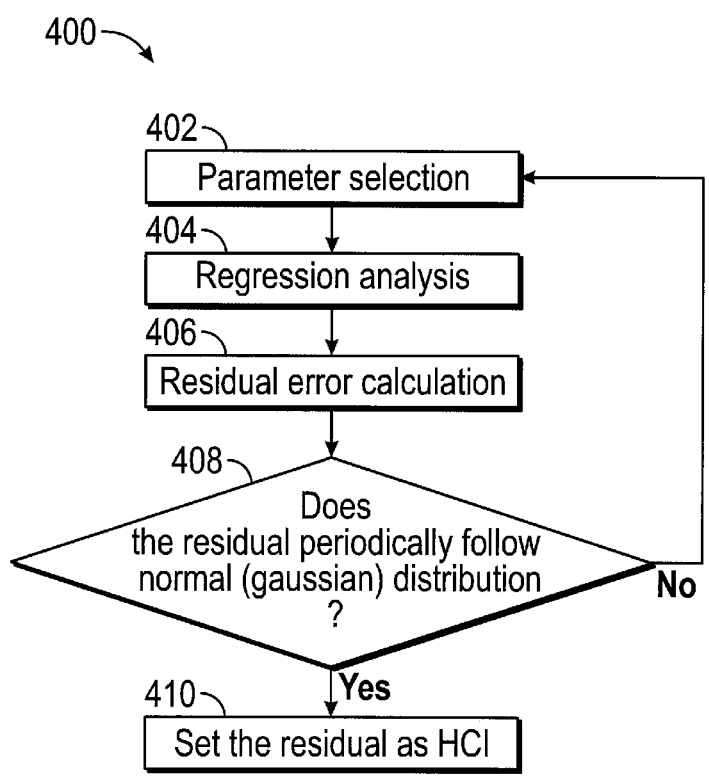
FIG. 4 shows an example of logic for generating the Historical Health Condition Index (HHCI).

FIG. 4 shows an example of logic 400 for generating the Historical Health Condition Index (HHCI) 400. As shown in FIG. 4, the HHCI generation process may be an iteration process. The parameter selection 402 may select at least two parameters for the regression analysis 404. The parameter may be selected from OPs which may be represented by sensor data stored in the memory 109. The parameter may also be environmental data such as environmental temperature. The parameter selection 402 may be a random pick from the equipment sensor data and environmental data that may be highly correlated with OP or may also be made according the previous iteration or the historical parameter selections.

The regression analysis 404 shown in FIG. 4 may include applying a regression formula to represent the coordinated relationship of parameters selected from the step of parameter selection 402. The regression analysis 404 may be a liner regression. Any other regression analysis methods may also be used. Because the regression may closely represent the performance of healthy equipment, the sample data chosen including sensor data or environmental data may be for the period when the equipment is under relatively good health condition. The regression formula may be represented by a function of selected parameters regarding the OP as shown in Formula 1 above.

The residual error calculation 406 may calculate the difference between the calculated and actual value of OP. The actual value of OP may be sensor data stored as historical records in the memory 109. The calculated value of OP may be calculated by using the regression formula developed in the regression analysis 404. The residual errors may be calculated by using Formula 2 above.

After the residual errors are calculated, a determination may be made based on whether the residual periodically follows the normal distribution 408. If the residual errors follow the normal distribution, residual errors may be set as HHCI 410 as illustrated in Formula 3 above. However, if the residual errors do not follow the normal distribution, the iteration as shown in FIG. 4 may be performed again by starting at the parameter selection 402.

Figure 5:
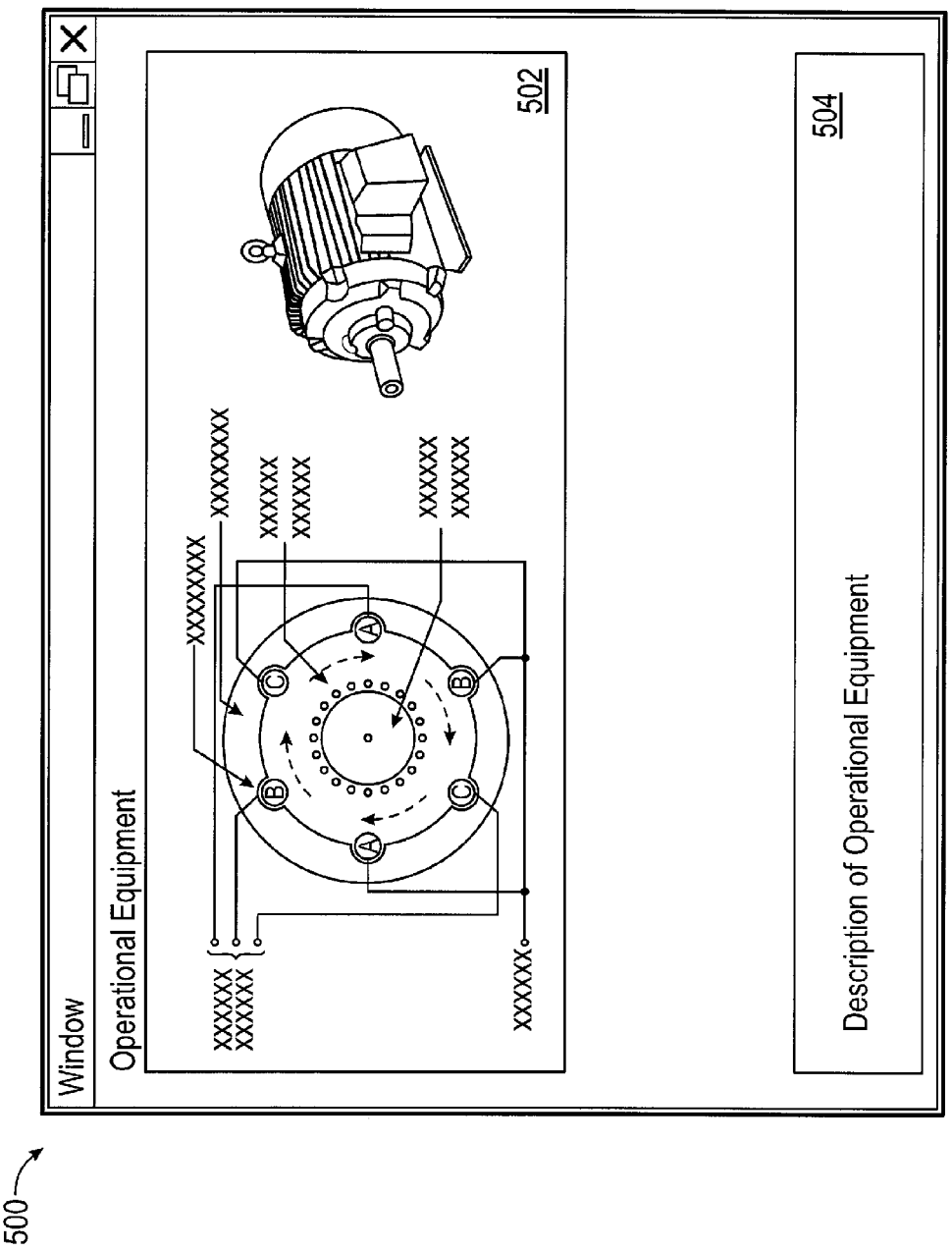
FIG. 5 shows an example window for displaying operational equipment.

FIG. 5 shows an example window 500 for displaying operational equipment. The window 500 may include an image of the operational equipment 502 and a description of the operational equipment 504. As shown in FIG. 5, the operational equipment 502 is displayed. Other information for the operational equipment 502 may also be displayed.

Figure 6:
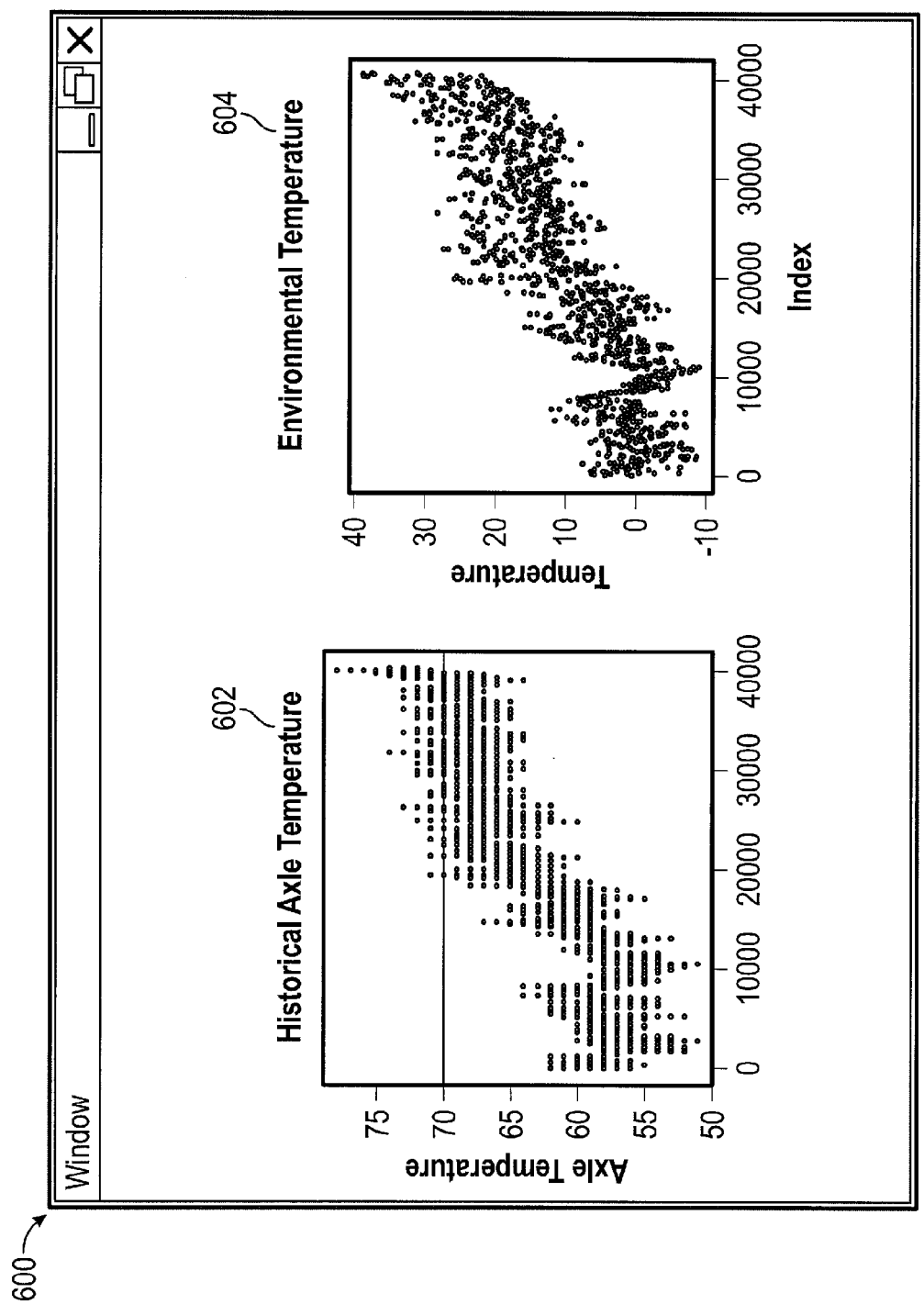
FIG. 6 shows an example window to display historical axle temperature and environmental temperature.

FIG. 6 shows an example window 600 to display historical axle temperature 602 and environmental temperature 604. A subset of historical sensor data may be selected as OPs that are used for monitoring of equipment. Because environmental condition may affect the production and operation condition of the equipment, certain environment data may be selected for the equipment degradation analysis. As shown in FIG. 6, Historical axle temperature 602 and the environmental temperature 604 may have a similar moving pattern. Thus, both the sensor data (also OP) historical axle temperature 602 and environmental temperature 604 may be selected as parameters for the regression analysis for generating HCIs for the equipment degradation analysis.

Figure 7:
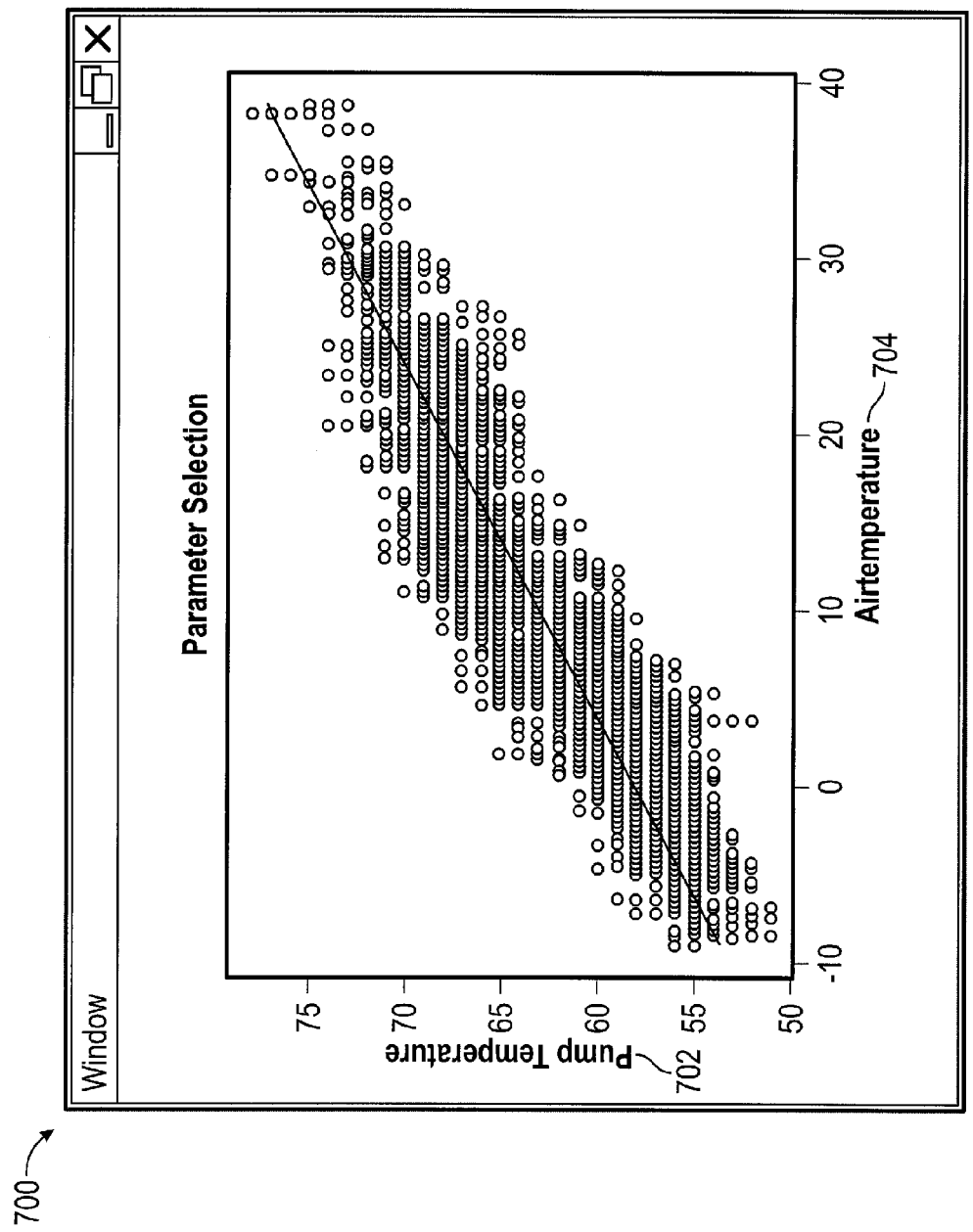
FIG. 7 shows an example window for parameter selection.

FIG. 7 shows an example window for parameter selection 700. As shown in FIG. 7, the historical values for pump temperature 702 and air temperature 704 are displayed. According to FIG. 7, the pump temperature 702 and air temperature 704 are highly related.

Figure 8:
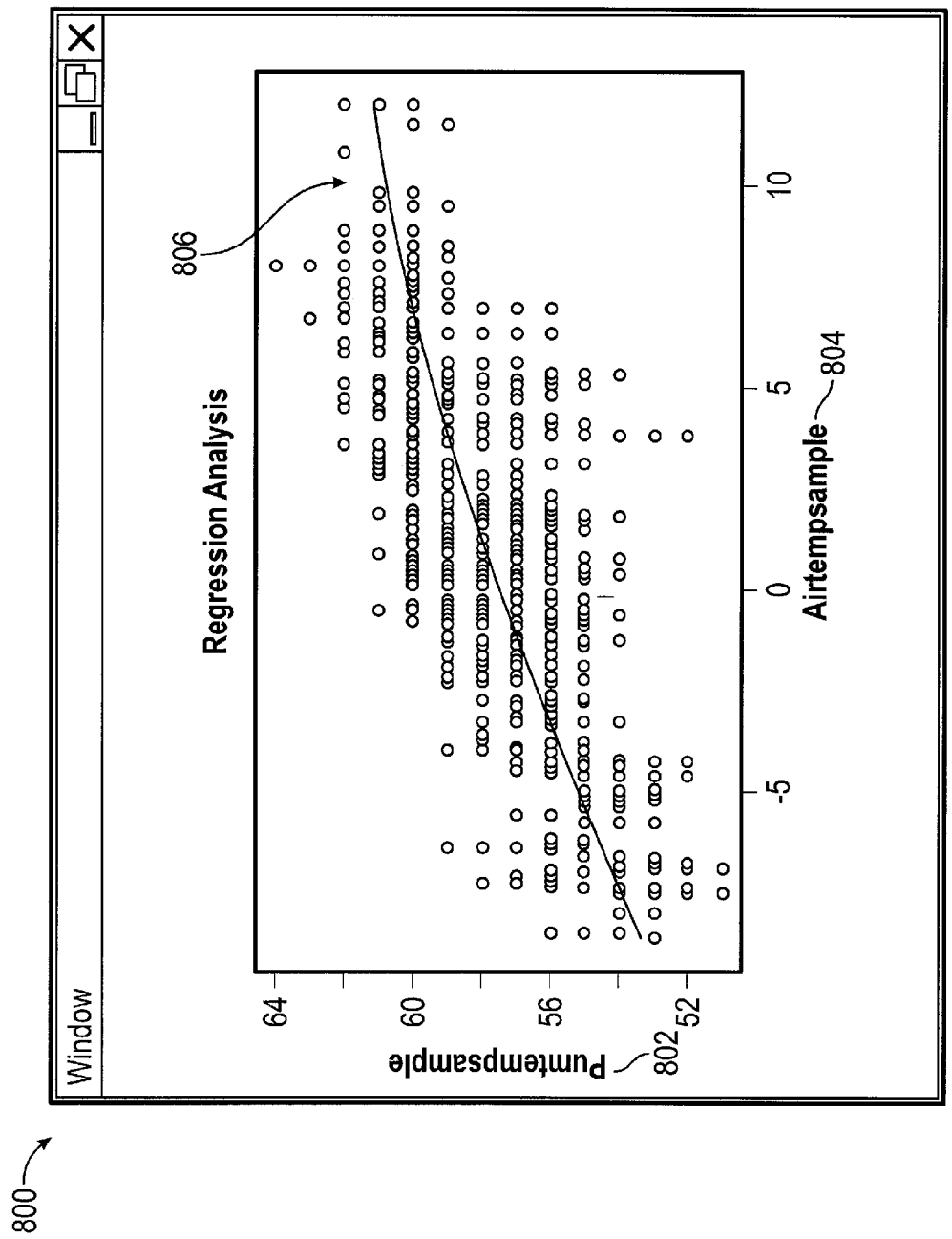
FIG. 8 shows an example window for regression analysis.

FIG. 8 shows an example window for regression analysis 800. As shown in FIG. 8, the regression is performed for the temperature of pump 802 and temperature of air 804. The solid line showed in the regression analysis window may represent the relationship between pumtempsample 802 and airtemsample 804. The solid line may be a representation of the regression formula.

Figure 9:
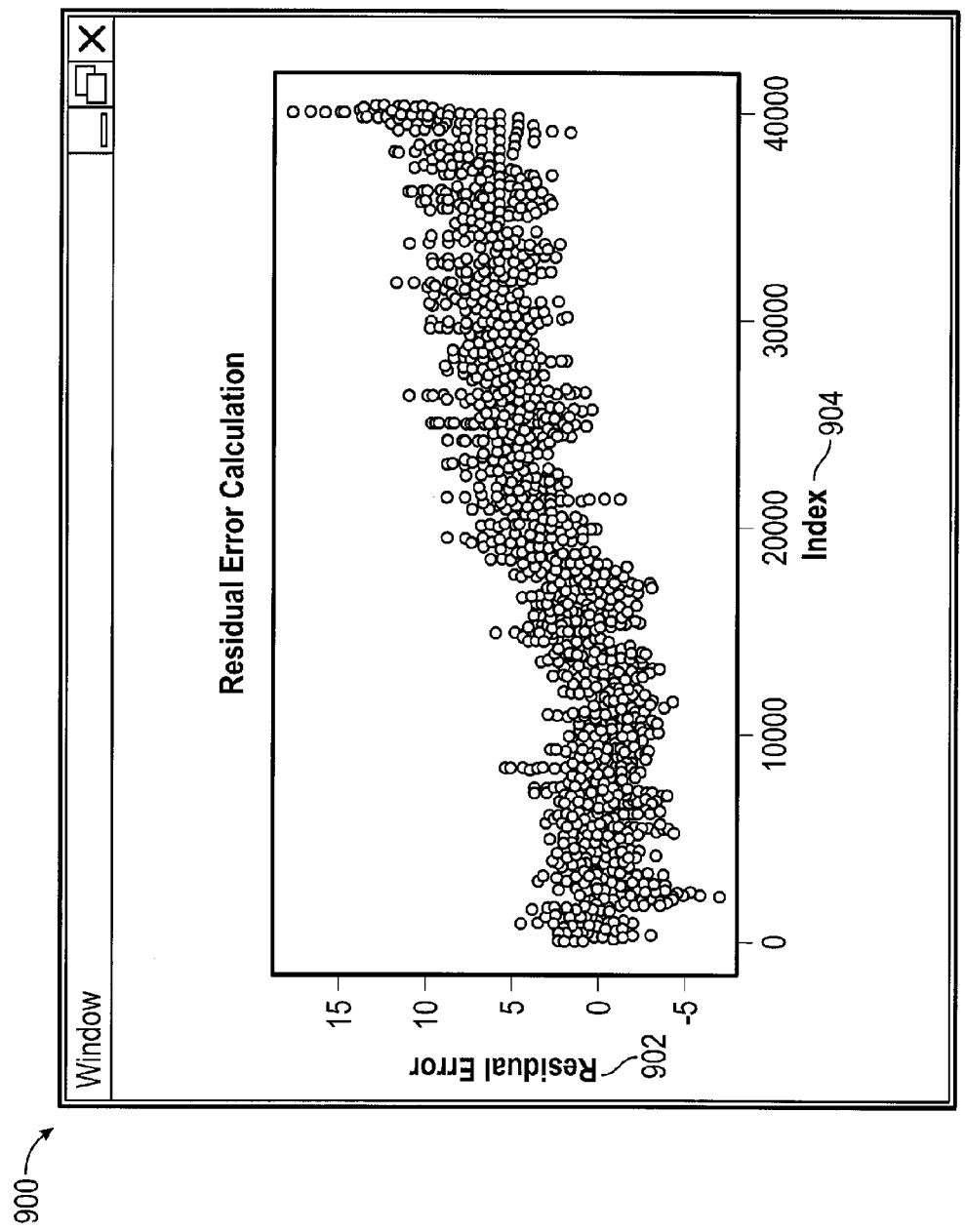
FIG. 9 shows an example window for residual error calculation.

FIG. 9 shows an example window for residual error calculation 900. As shown in FIG. 9, residual error 902 may reflect the difference between the calculated OP and the actual OP that may be stored as historical values in the measurement memory 109. The residual error 902 may be calculated by using Formula 2 above. The time index 904 shows the time index of the series of the residual errors 902.

Figure 10:
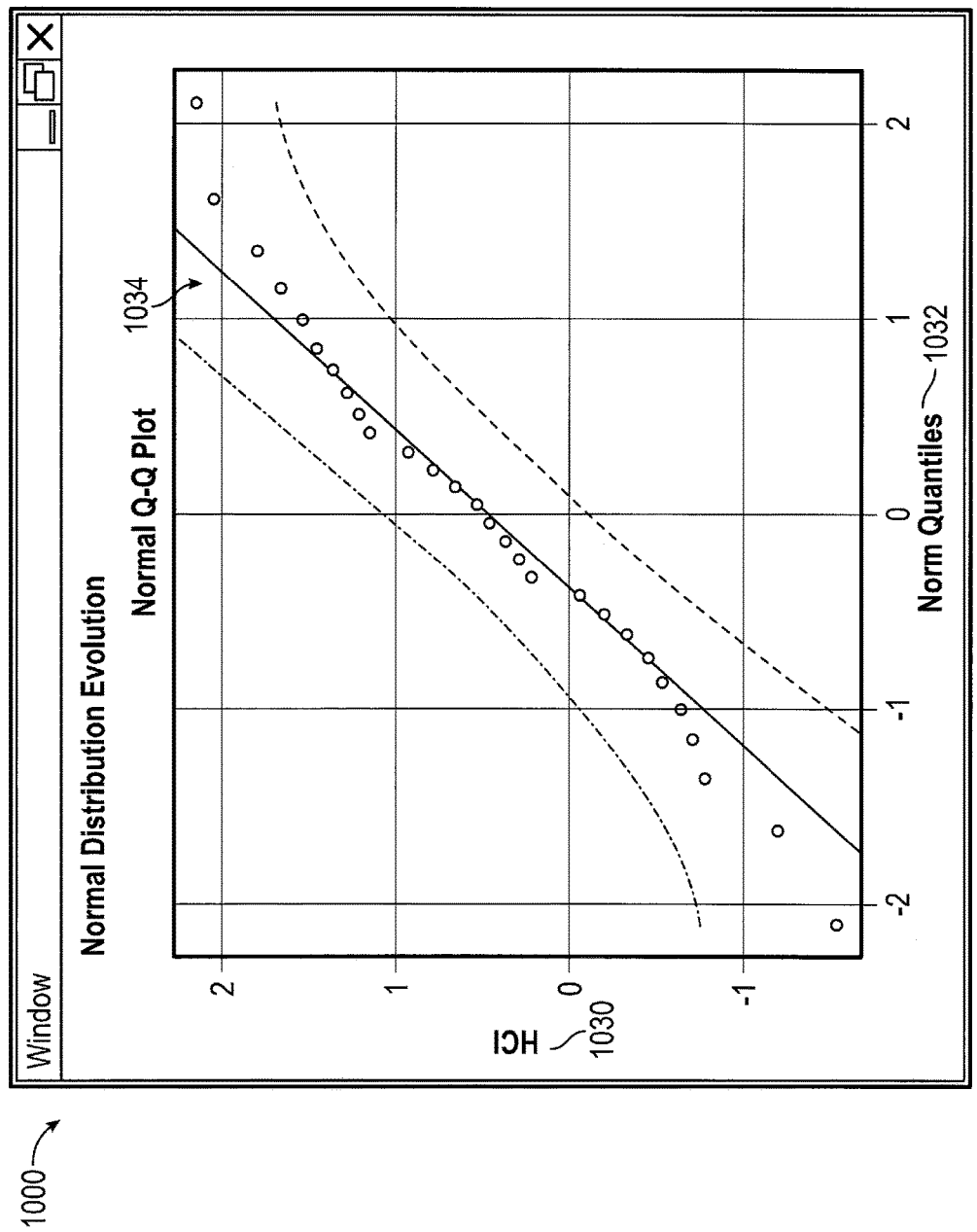
FIG. 10 shows an example window for normal distribution evaluation.

FIG. 10 shows an example window for normal distribution evaluation 1000. As discussed above, when residual errors follow a normal distribution, the residual errors may be set as the HHCI. As shown in FIG. 10, when plots of HCI 1030 and norm quantiles 1032 generally follows a sold straight line 1034 and distributes between the dashed line 1036 and 1038, the residual errors may follow a normal distribution, and the residual errors may be set as the HHCI.

Figure 11:
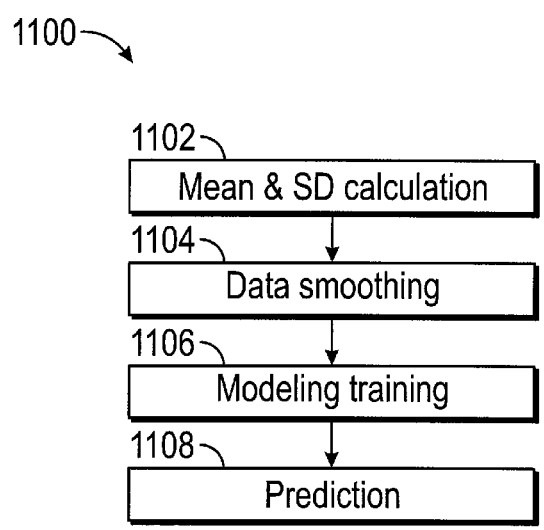
FIG. 11 illustrates an example of a process for generating Future Health Condition Index (FHCI).

FIG. 11 illustrates an example of logic 1100 for generating the predicted mean series and standard deviation (SD) series of FHCI. The logic 1100 includes determining the periodic mean of HHCI such as the daily mean or the weekly mean may be calculated (1102). The standard deviation of HHCI may also be calculated. In the logic of Data smoothing 1104, the noise or local fluctuation of the mean series and SD series of HHCI may be filtered out to get the overall trend. The modeling training 1104 may be to get the approximate fitting and prediction model based on the smoothed periodic mean and SD series of HHCI. Finally, prediction 1108 may be to predict the mean series and SD series of future HCI (FHCI).

Figure 12:
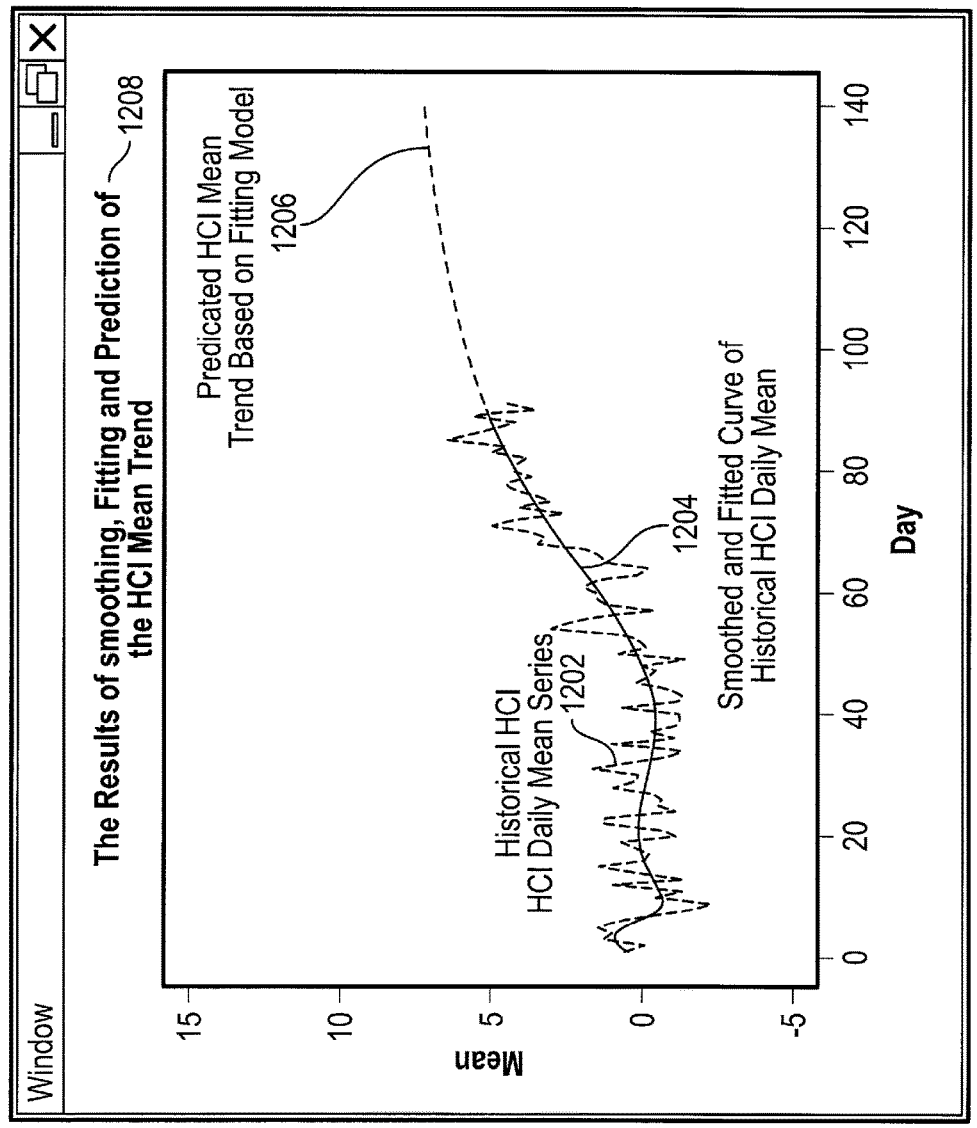
FIG. 12 shows an example window for smoothing, fitting and prediction of HCI Mean Trend.

FIG. 12 shows an example window 1200 for smoothing, fitting and prediction of HCI Mean Trend. As illustrated in FIG. 12, Historical HCI daily mean series 1202 are displayed as the zigzagged line, the smoothed and fitted curve of historical HCI daily mean 1204 shows as the smoothed curved line. Predicted mean trend of FHCI based on fitting model 1206 is displayed as smoothed curve for the range of about $90^{th}$ to $140^{th}$ day 1208.

Figure 13:
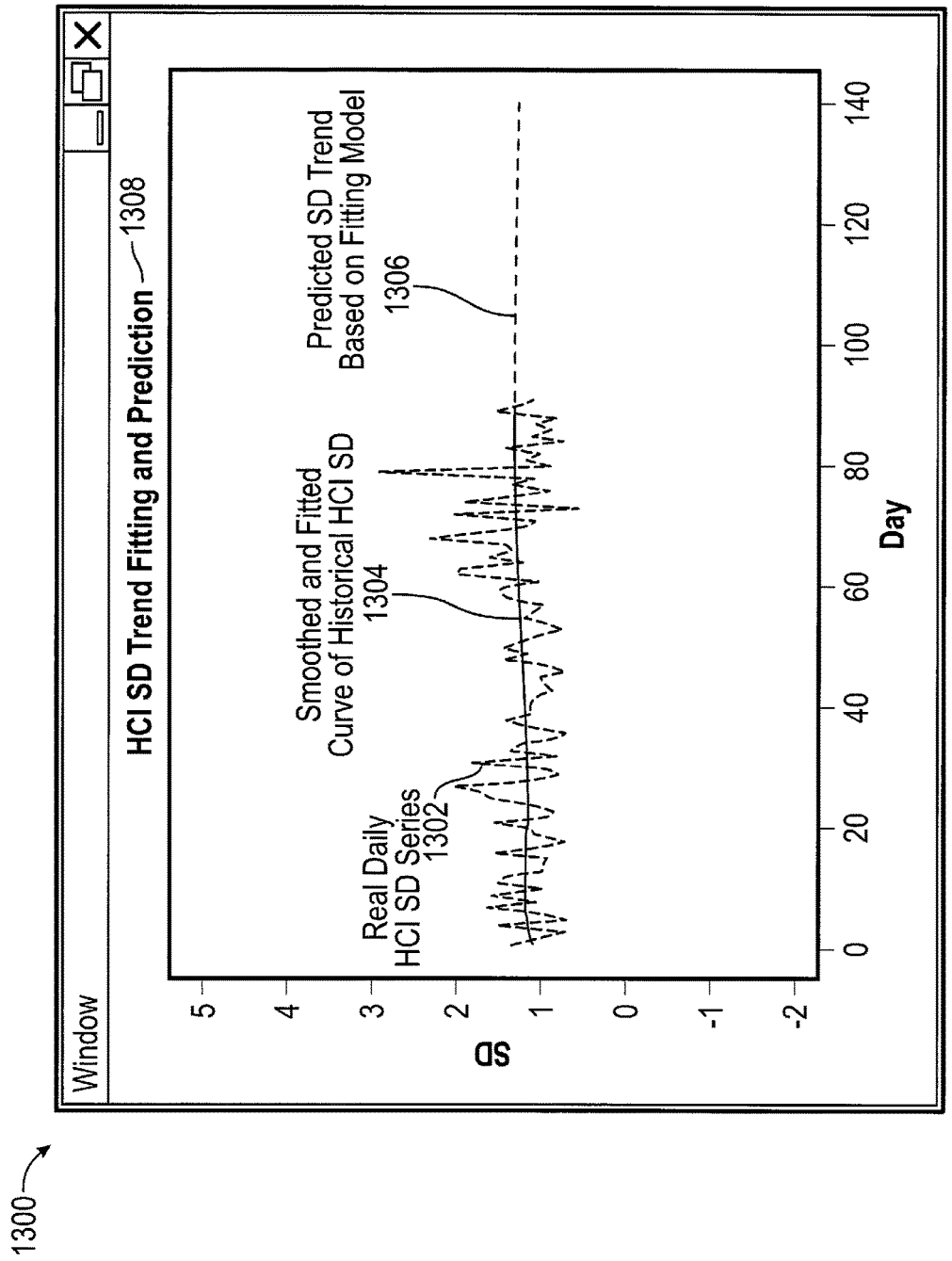
FIG. 13 shows an example window for standard deviation trend fitting and prediction.

FIG. 13 shows an example window for HCI SD trend smoothing, fitting and prediction 1300. As shown in FIG. 13, the real daily HHCI SD series 1302, smoothed and fitted curve of HHCI SD 1304 and predicted SD trend based on fitting model 1306 are displayed in SD trend fitting and prediction window 1300. The day 1308 range for the SD trend fitting and prediction is about from $1^{th}$ to $140^{th}$ day. In FIG. 13, the curve for approximate $90^{th}$ to $140^{th}$ day may be predicted.

Figure 14:
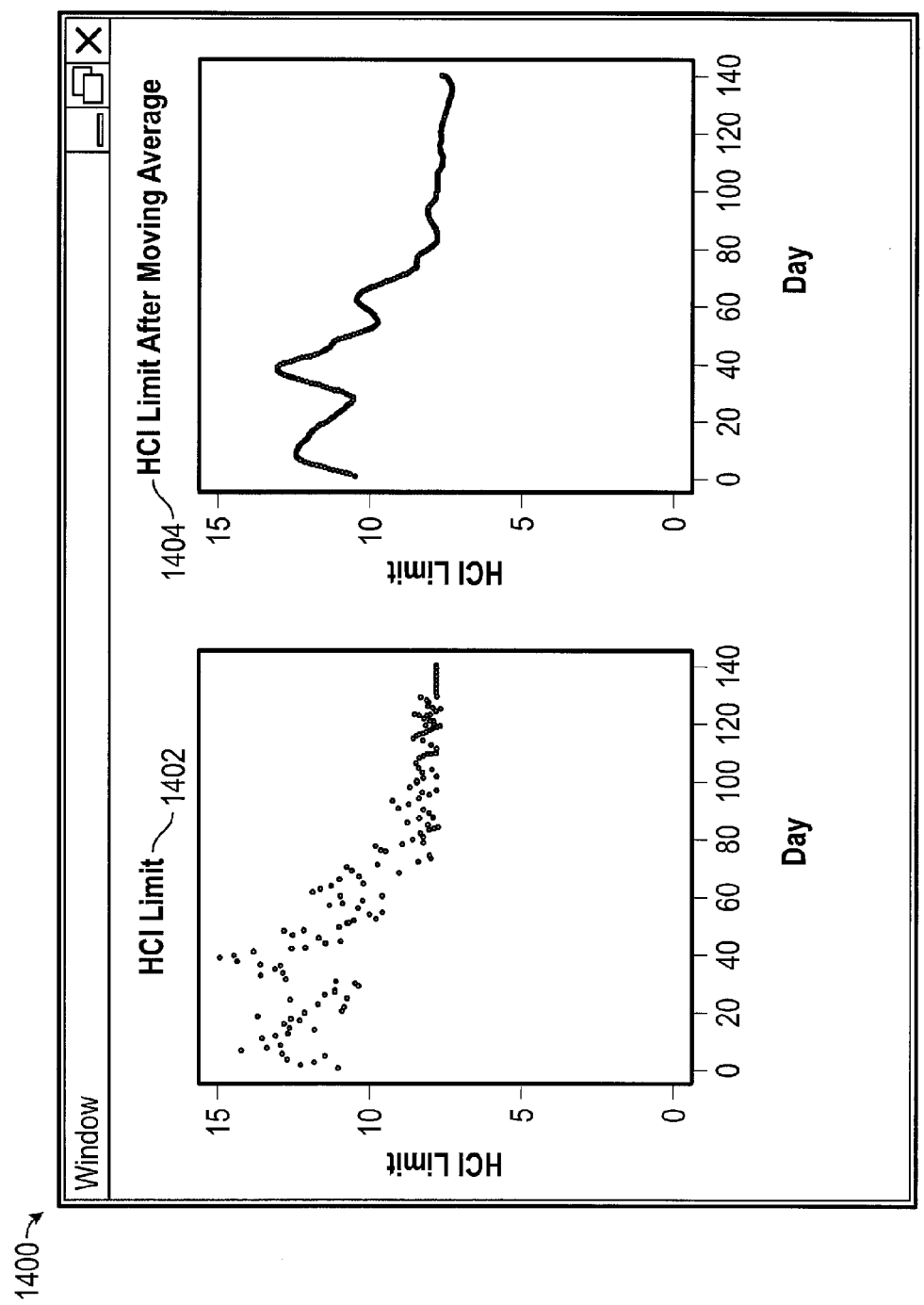
FIG. 14 shows an example window for displaying HCI limit and HCI limit after moving average.

FIG. 14 shows an example window for displaying HCI limit and HCI limit after moving average 1400. As the OP limit may be provided by the manufacturer or industry standard and the HCI is the residual errors between actual OP and calculated OP, the HCI limit 1402 may be calculated by subtracting calculated OP from OP limit. The formula to calculate and predict OP is shown in Formula 1 above. The formula to calculate HCI limit is shown in Formula 4 above. FIG. 14 shows the calculated HCI limit 1402. The HCI limit after moving average 1404 in FIG. 14 shows the HCI limit after removing possible noise.

Figure 15:
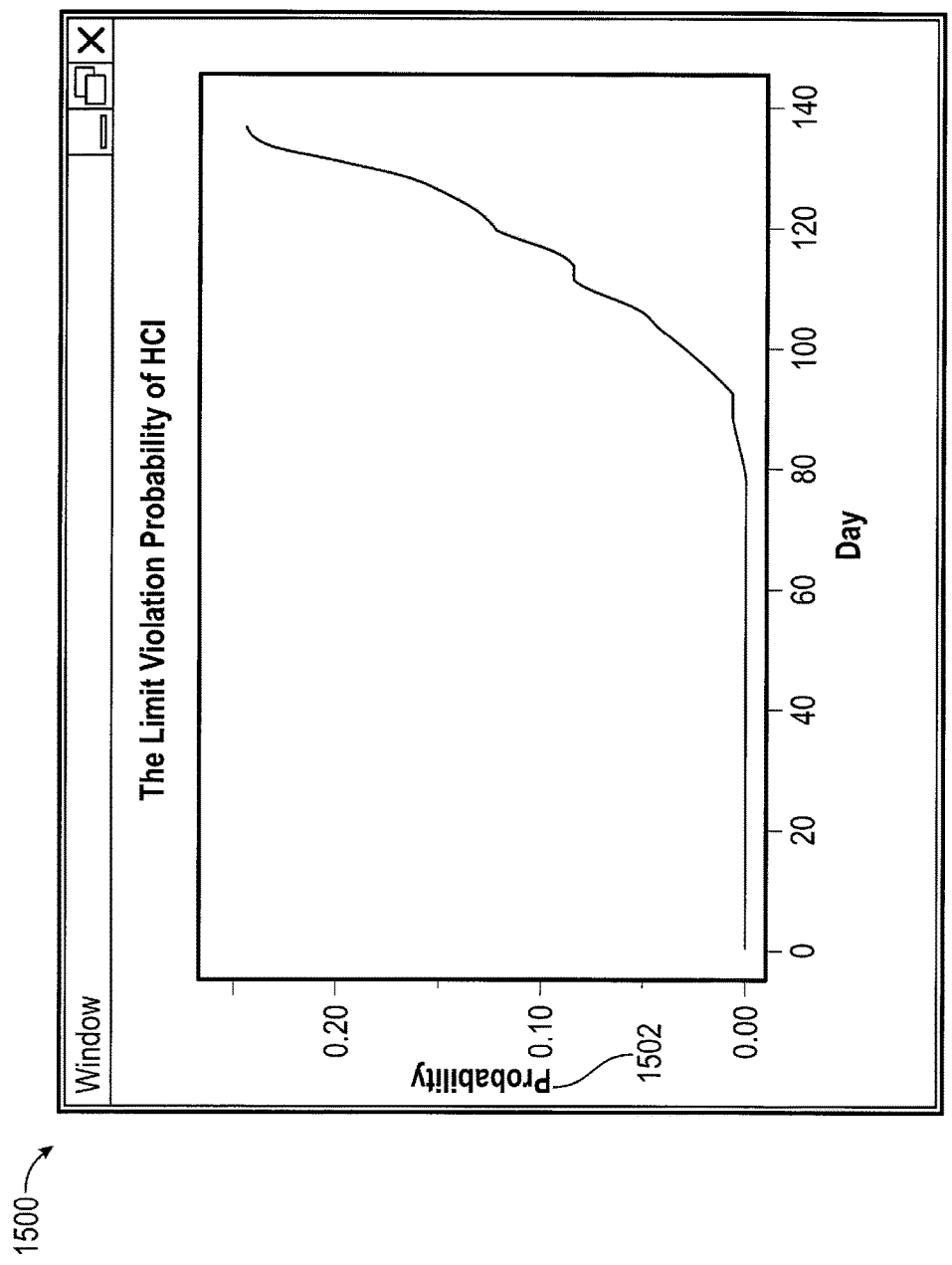
FIG. 15 shows an example window for the limit violation probability of HCI.

FIG. 15 shows an example window for the limit violation probability of HCI 1500. The limit violation probability of HCI may be calculated by using calculated HCI limit, predicted daily HCI mean and SD with the Formula 5 as shown above. FIG. 15 shows the limit violation probabilities 1502 for the limit violation probability of HCI for the day range of $1^{th}$ to $140^{th}$ day.

Figure 16:
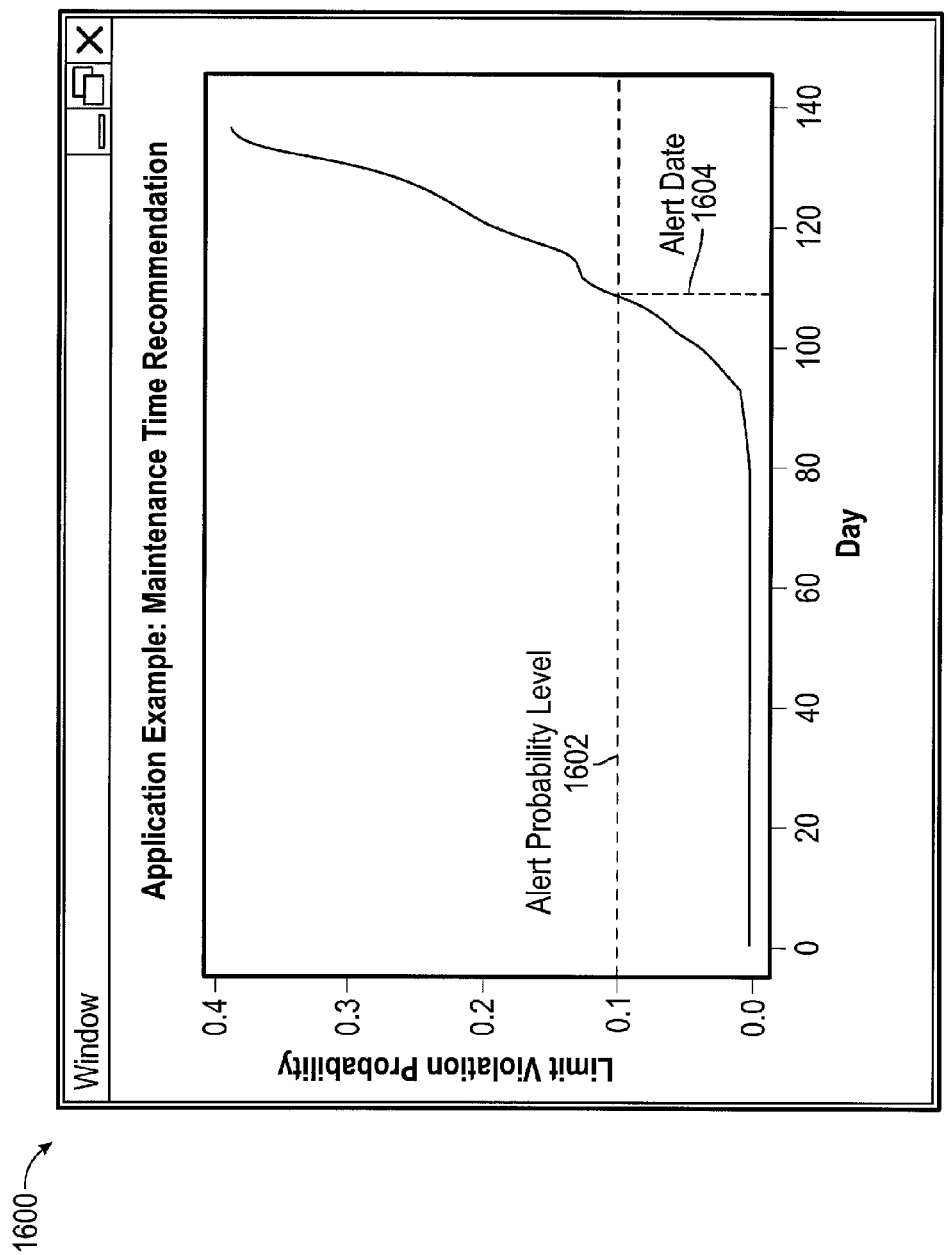
FIG. 16 shows an example window for generating alert date when the alert probability level reaches a certain level.

FIG. 16 shows an example window for generating alert date when the alert probability level reaches a certain level. As shown in FIG. 16, when the alter probability level 1602 is 0.10 (10%), the alert date 1604 may be determined. According to FIG. 16, the alert date 1604 is at approximately $109^{th}$ day.

After the maintenance of the equipment is performed, the HCI model may need to be updated for the further prediction. In general, after maintenance is performed, the equipment may be under better healthy condition. HCI mean & HCI SD of the first period (day, week or month) may be calculated after the equipment enters into stable operation after maintenance.

Figure 17:
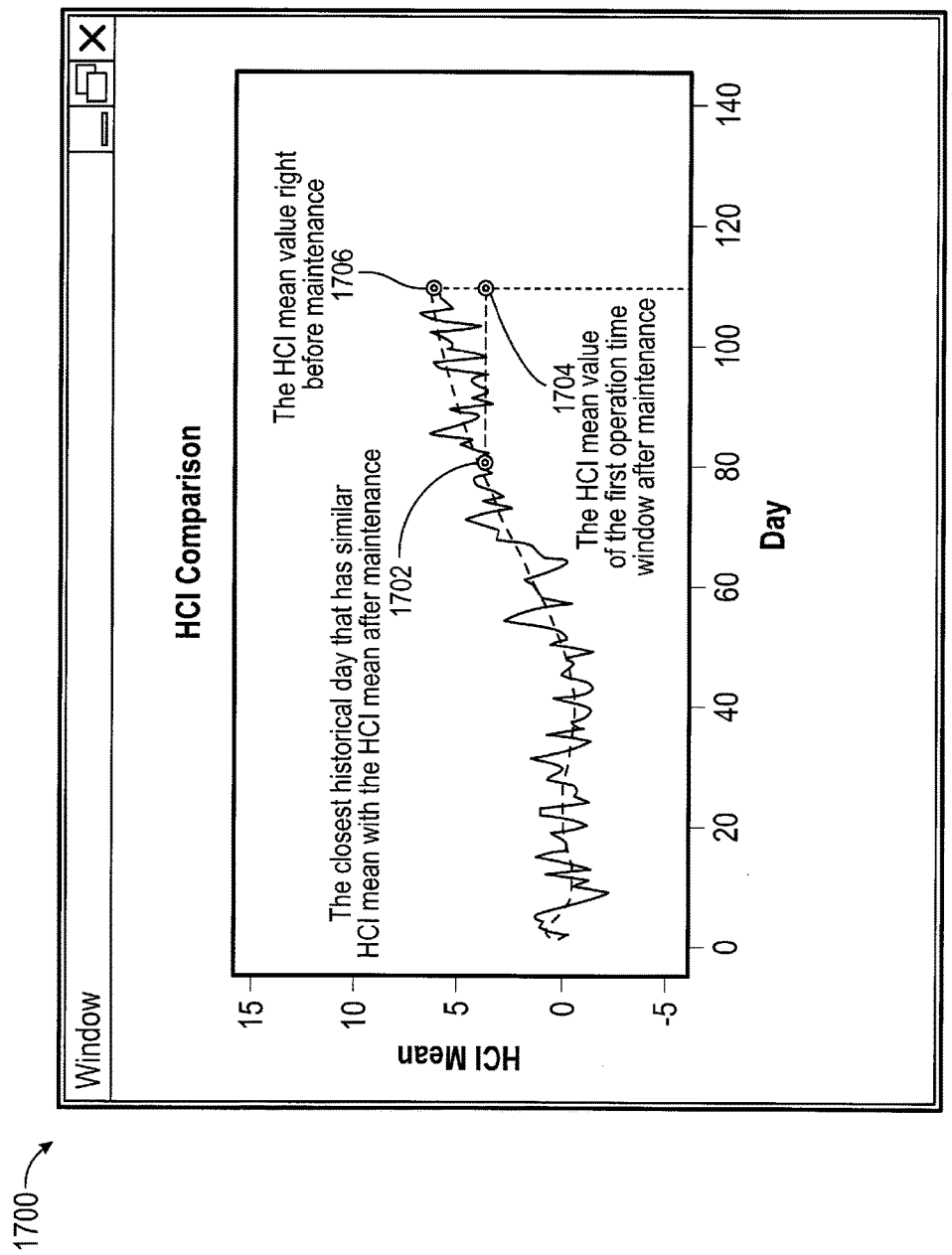
FIG. 17 shows an example window to show HCI mean values before and after maintenance.

FIG. 17 shows an example window to show the HCI values before and after maintenance. As shown in FIG. 17, the HCI mean value after maintenance 1704 may be lower than the HCI mean value before maintenance 1706 is performed. FIG. 17 also shows the closest point with similar HCI mean of after maintenance 1702. As shown, the closest point with similar HCI mean of after maintenance 1702 may be on the day ($80^{th}$ day) before the day ($108^{th}$ day) when the maintenance is performed.

Figure 18:
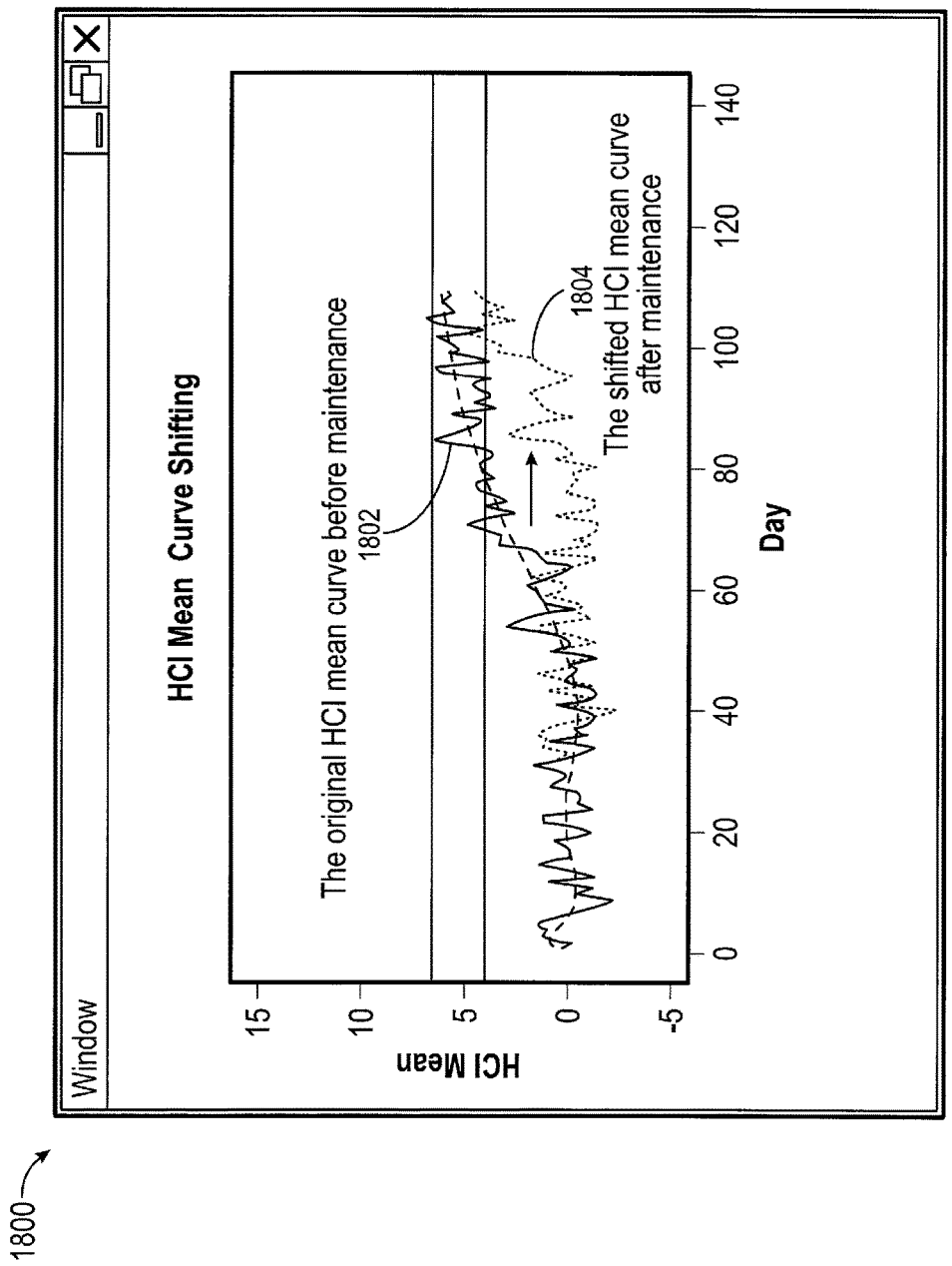
FIG. 18 shows an example window to show the shifted curve after maintenance.

After finding backward in the historical HCI Mean curve for the point that has closest value 1702 with the new HCI mean value after maintenance 1704, it may be considered that the equipment has been recovered to the same health level of that historical point after the maintenance is performed. As such, the historical points of the mean curve and SD curve between that historical time point 1702 and the maintenance time point 1706 may be deleted. The curve of HHCI mean and SD before that historical time point 1702 may be shifted to the maintenance time point 1706 as the update HHCI mean curve and SD curve for the equipment after maintenance. FIG. 18 shows an example of a HHCI mean curve shifting window to show the shifted curve after maintenance. As shown in FIG. 18, the shifted HHCI mean curve after maintenance 1802 is on the right side of the original HHCI mean curve before maintenance 1804.

Any of the windows 500, 600, 700, 800, 900, 1000, 1200, 1300, 1400, 1500, 1600, 1700, 1800, 1900, 2000 may be generated by the processor 108 and displayed on the display 120.

Figure 19:
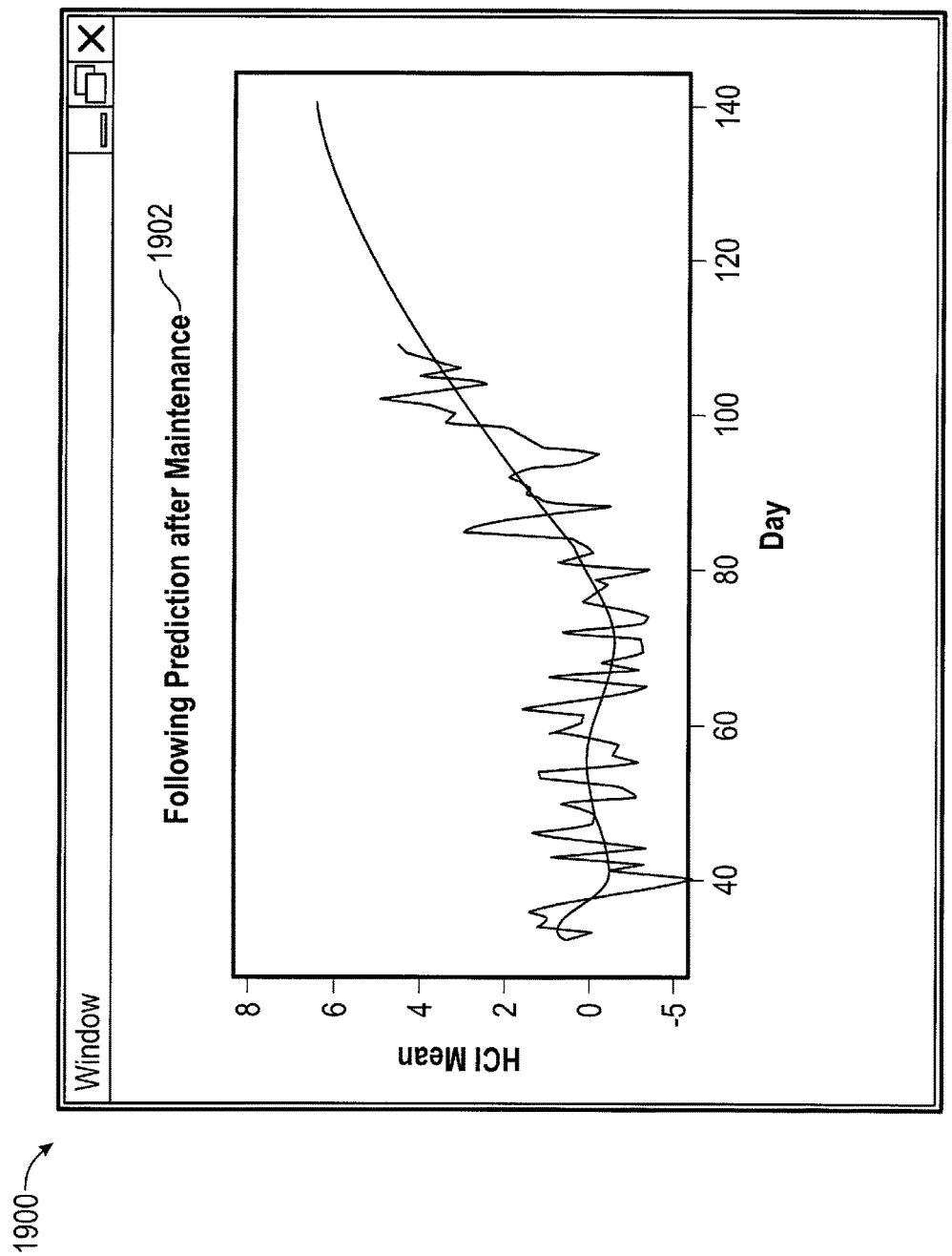
FIG. 19 shows an example window to show the prediction after the shifted curve is obtained.

After the curves are shifted, the previously disclosed methods may be applied again for fitting and predicting the trend of Mean and SD of HCI. FIG. 19 shows an example of a following prediction window to show the prediction after the shifted HHCI mean curve is obtained. Following prediction 1902 as shown in FIG. 19 shows the predicted HCI mean after the curve is shifted.

Figure 20:
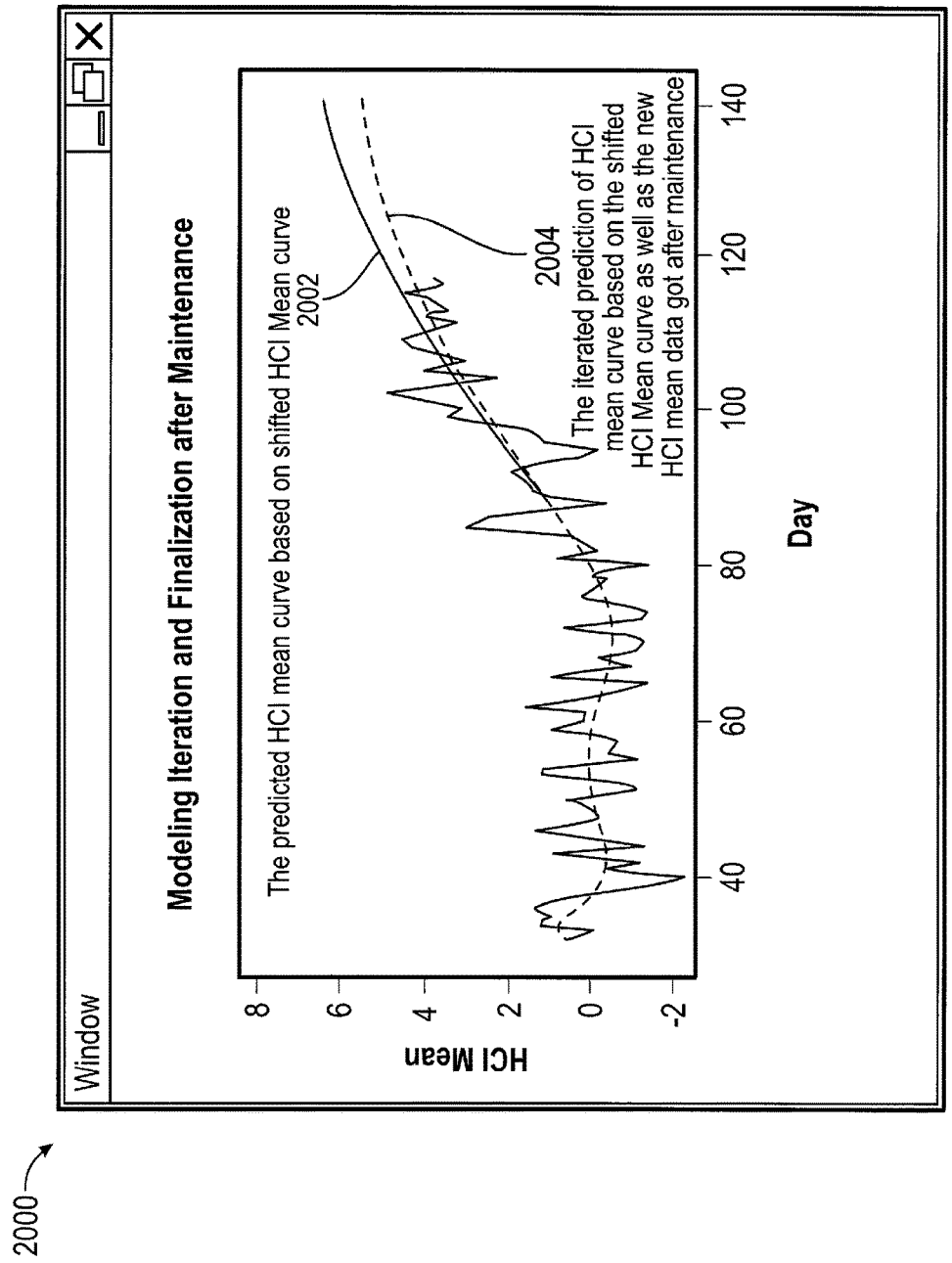
FIG. 20 shows an example window to show the update model after maintenance.

Sometimes, due to the equipment status might not be very stable after maintenance, or due to the actual equipment condition after maintenance is not exactly the same as the shifted HHCI mean curve 1802 shows, so it may be needed to repeat the previous steps illustrated in FIGS. 17-19 until the fitting model becomes stable. FIG. 20 shows an example of a modeling iteration and finalization after maintenance window to show the update model after maintenance. The predicted HCI mean curve before model iteration 2002 may be generated based on shifted HHCI Mean curve after maintenance. The predicted HCI mean curve after model iteration 2004 may be generated based on not only the shifted HHCI Mean curve but also the new HCI mean data calculated from the new equipment sensor data and environmental data collected after maintenance. The modeling iteration and finalization after maintenance 2004 shows the stable model as the update model for the new status of the equipment after maintenance.

The method and/or system, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system comprising:
   a communication interface circuitry configured to receive:
      equipment sensor data time series from a sensor disposed inside an operational equipment representing an equipment performance parameter from among multiple different performance parameters associated with the operational equipment; and
      environmental data time series representing an environmental characteristic of a location where the operational equipment is located;
   a measurement database configured to store the equipment sensor data time series and the environmental data time series received from the communication interface circuitry;
   display generation circuitry configured to generate a display signal comprising:
      a relationship analysis window;
      a residual error window;
      a performance condition window; and
      a maintenance trigger window; and
   equipment analysis circuitry in communication with the measurement database and the display generation circuitry, the equipment analysis circuitry configured to:
      select, among the equipment sensor data time series and environmental data time series in the measurement database, a subset of historical equipment sensor data and a corresponding subset of historical environmental data obtained when the operational equipment was running during a time period of healthy condition;
      evaluate a coordinated healthy condition relationship between the selected subset of historical equipment sensor data and the selected subset of historical environmental data to obtain a relationship output, and provide the relationship output for display in the relationship analysis window;
      determine a calculated equipment sensor data time series based on the coordinated healthy condition relationship and the environmental data time series stored in the measurement database;
      determine residual error time series showing differences between the calculated equipment sensor data time series and the equipment sensor data time series stored in the measurement database, and provide the residual errors for display in the residual error window;
      determine that the residual error time series follow a normal distribution by:
         dividing the residual errors into groups according to time windows of a predetermined time unit; and
         determining that the residual error time series follow a normal distribution in each of the time windows based on comparing calculated quantiles of the residual error time series in each time window and a set of norm quantiles;
      upon determining that the residual error time series follow a normal distribution:
         use the residual error time series as a Historical Health Condition Index (HHCI) for the operational equipment; and
         generate a Future Health Condition Index (FHCI) from the HHCI by:
            calculating a mean and a standard deviation for the residual error time series for each time window;
            training a predictive model for future mean and standard deviation for residual error based on the calculated means and standard deviation for the residual error time series; and
            determining the FHCI based on the predictive model;
      provide the HHCI and the FHCI for display in the performance condition window; and
      generate an equipment maintenance trigger for the operational equipment by establishing a maintenance trigger threshold for a limit violation probability for a predetermined HCI limit based on the predictive model, and provide the equipment maintenance trigger for display in the maintenance trigger window.

2. The system of claim 1, wherein the coordinated healthy condition relationship comprises a linear regression.

3. The system of claim 1, wherein the environmental data represent an ambient temperature.

4. The system of claim 1, wherein the equipment analysis circuitry is further configured to generate the FHCI for future time according to the HHCI.

5. The system of claim 1, wherein the equipment analysis circuitry is further configured to apply a smooth function to the HHCI and the FHCI to filter out noise, local fluctuation or both to obtain an overall trend of HCI.

6. The system of claim 1, wherein the limit violation probability for a future residual error is determined by the equipment analysis circuitry based on the predetermined HCI limit, a mean and standard deviation of the future residual error predicted by the predictive model.

7. The system of claim 1, wherein the equipment analysis circuitry is further configured to generate a maintenance notification and send the maintenance notification to a recipient by using the communication interface circuitry when the trigger threshold is exceeded.

8. The system of claim 1, wherein the display signal further comprises an informational window for the operational equipment, wherein the informational window comprises an image of the operational equipment and a description of the operational equipment.

9. A method comprising:
receiving, from a communication interface circuitry, equipment sensor data time series from an sensor disposed inside an operational equipment representing an equipment performance parameter from among multiple different performance parameters associated with the operational equipment;
receiving, from the communication interface circuitry, environmental data time series representing an environmental characteristic of a location where the operational equipment is located;
storing the equipment sensor data time series and the environmental data time series received from the communication interface circuitry into a measurement database;
generating, by display generation circuitry, a display signal to display: a relationship analysis window, a residual error window, a performance condition window, and a maintenance trigger window;
selecting, by equipment analysis circuitry, among the equipment sensor data time series and environmental data time series in the measurement database, a subset of historical equipment sensor data and a corresponding subset of historical environmental data obtained when the operational equipment was running during a time period of healthy condition;
evaluating, by the equipment analysis circuitry that is in communication with the measurement database and the display generation circuitry, a coordinated healthy condition relationship between the selected subset of historical equipment sensor data and the selected subset of historical environmental data to obtain a relationship output, and providing the relationship output for display in the relationship analysis window;
determining, by the equipment analysis circuitry, a calculated equipment sensor data time series based on the coordinated healthy condition relationship and the environmental data time series stored in the measurement database;
determining, by the equipment analysis circuitry, residual error time series showing differences between the calculated equipment sensor data time series and the equipment sensor data time series stored in the measurement database, and providing the residual errors for display in the residual error window;
determine that the residual error time series follow a normal distribution by:
dividing the residual errors into groups according to time windows of a predetermined time unit; and
determining that the residual error time series follow a normal distribution in each of the time windows based on comparing calculated quantiles of the residual error time series in each time window and a set of norm quantiles;
upon determining that the residual error time series follow a normal distribution:
using, by the equipment analysis circuitry, the residual error time series as a Historical Health Condition Index (HHCI) for the operational equipment; and
generating a Future Health Condition Index (FHCI) from the HHCI by:
calculating a mean and a standard deviation for the residual error time series for each time window;
training a predictive model for future mean and standard deviation for residual error based on the calculated means and standard deviation for the residual error time series; and
determining the FHCI based on the predictive model;
providing the HHCI and the FHCI for display in the performance condition window; and
generating, by the equipment analysis circuitry, an equipment maintenance trigger for the operational equipment by establishing a maintenance trigger threshold for a limit violation probability for a predetermined HCI limit based on the predictive model, and providing the equipment maintenance trigger for display in the maintenance trigger window.

10. The method of claim 9, wherein the coordinated healthy condition relationship comprises a regression.

11. The method of claim 9, wherein the FHCI is generated for future time according to the HHCI.

12. The method of claim 9, further comprising: applying, by the equipment analysis circuitry, a smooth function to the HHCI to filter out noise, local fluctuation or both.

13. The method of claim 9, wherein the limit violation probability for a future residual error is determined by the equipment analysis circuitry based on the predetermined HCI limit, a mean and standard deviation of the future residual error predicted by the predictive model.

14. The method of claim 9, further comprising: generating, by the equipment analysis circuitry, a maintenance notification, and sending the maintenance notification to a recipient by using the communication interface circuitry when the trigger threshold is exceeded.

15. The method of claim 9, wherein generating the display signal by the display generation circuitry to further display in an informational window for the operational equipment, wherein the informational window comprises an image of the operational equipment and a description of the operational equipment.

16. A system comprising:
a communication interface circuitry configured to receive:
equipment sensor data time series from an temperature sensor disposed inside an operational equipment representing an operational temperature of the operational equipment; and environmental data time series representing an ambient temperature for the operational equipment;
a measurement database configured to store the equipment sensor data time series and the environmental data time series received from the communication interface circuitry;
display generation circuitry configured to generate a display signal comprising:
a relationship analysis window;
a residual error window;
a performance condition window; and
a maintenance trigger window; and
equipment analysis circuitry in communication with the measurement database and the display generation circuitry, the equipment analysis circuitry configured to:
select, among the equipment sensor data time series and environmental data time series in the measurement database, a subset of historical equipment sensor data and a corresponding subset of historical environmental data obtained when the operational equipment was running during a time period of healthy condition;
perform a regression analysis between the selected subset of historical equipment sensor data and the selected subset of historical environmental data to obtain a relationship output, and provide the relationship output for display in the relationship analysis window;
determine a calculated equipment sensor data time series based on the relationship output and the environmental data time series stored in the measurement database;
determine residual error time series showing differences between the calculated equipment sensor data time series output and the equipment sensor data time series stored in the measurement database, and provide the residual errors for display in the residual error window;
determine that the residual error time series follow a normal distribution by:
dividing the residual errors into groups according to time windows of a predetermined time unit; and
determining that the residual error time series follow a normal distribution in each of the time windows based on comparing calculated quantiles of the residual error time series in each time window and a set of norm quantiles;
upon determining that the residual error time series follow a normal distribution:
use the residual error time series as a Historical Health Condition Index (HHCI) for the operational equipment;
generate a Future Health Condition Index (FHCI) from the HHCI for a selected future time by:
calculating a mean and a standard deviation for the residual error time series for each time window;
train a predictive model for future mean and standard deviation for residual error based on the calculated means and standard deviation for the residual error time series; and
determine the FHCI for the selected future time based on the predictive model;
provide the HHCI and the FHCI for display in the performance condition window;
generate an equipment maintenance trigger for the operational equipment for a future date by establishing a maintenance trigger threshold for a limit violation probability for a predetermined HCI limit based on the predictive model, and provide the equipment maintenance trigger for display in the maintenance trigger window; and
adjust the HHCI and the FHCI after equipment maintenance is performed on the operational equipment, and provide the adjusted HHCI and the adjusted FHCI for display in the maintenance trigger window.

17. The system of claim 16, wherein:
the equipment analysis circuitry is further configured to:
determine a maintenance HCI value for a maintenance time point when the equipment maintenance is performed, and search backwards to match the maintenance HCI value with a HHCI value at a matched historical time point;
eliminate data points between the matched historical time point and the maintenance time point in the maintenance trigger window and update the display in the maintenance trigger window.

* * * * *